United States Patent
Wang

(10) Patent No.: US 6,641,305 B2
(45) Date of Patent: Nov. 4, 2003

(54) TAP WATER TEMPERATURE MEASURING DEVICE

(75) Inventor: David Wang, Hsin-Tein (TW)

(73) Assignee: King-I Electromechanical Industry Co., Ltd. (TW)

( * ) Notice: Subject to any disclaimer, the term of this patent is extended or adjusted under 35 U.S.C. 154(b) by 0 days.

(21) Appl. No.: 10/075,298

(22) Filed: Feb. 15, 2002

(65) Prior Publication Data
US 2003/0156620 A1 Aug. 21, 2003

(51) Int. Cl.[7] .............................. G01K 1/02; G01K 1/14
(52) U.S. Cl. .................... 374/148; 374/208; 374/147; 374/170
(58) Field of Search ................. 374/148, 141, 374/147, 162, 163, 161, 170, 194, 208

(56) References Cited

U.S. PATENT DOCUMENTS

| 3,581,568 A | * | 6/1971 | Pfefer ........................ 73/343 |
| 3,635,086 A | * | 1/1972 | Beruck ...................... 73/343 R |
| 3,952,594 A | * | 4/1976 | McMahan ................... 73/349 |
| 4,241,868 A | * | 12/1980 | Perkins .................... 236/12 A |
| 4,281,543 A | * | 8/1981 | Raz .......................... 73/343 R |
| 4,509,550 A | * | 4/1985 | Monk ........................ 137/551 |
| 4,575,262 A | * | 3/1986 | Andersen .................. 374/147 |
| 4,630,940 A | * | 12/1986 | Ostertag et al. ........... 374/148 |
| 4,699,172 A | * | 10/1987 | MacDonald ............... 137/551 |
| 4,743,120 A | * | 5/1988 | Bowen ...................... 374/147 |
| 4,968,152 A | * | 11/1990 | Bergmann ................. 374/147 |
| 4,994,792 A | * | 2/1991 | Ziegler, Jr. ................ 340/584 |
| 5,076,709 A | * | 12/1991 | Tognotti ................... 374/147 |
| 5,109,864 A | * | 5/1992 | Lu ............................ 128/736 |
| 5,186,047 A | * | 2/1993 | Gordon et al. ............ 73/151 |
| 5,199,790 A | * | 4/1993 | Pawelzik et al. .......... 374/147 |
| 5,320,137 A | * | 6/1994 | Huang ....................... 137/551 |
| 5,324,114 A | * | 6/1994 | Vinci ........................ 374/208 |
| 5,535,779 A | * | 7/1996 | Huang ....................... 137/559 |
| 5,542,449 A | * | 8/1996 | Huang ....................... 137/551 |
| 5,915,415 A | * | 6/1999 | Huang ....................... 137/551 |
| 5,918,981 A | * | 7/1999 | Ribi .......................... 374/162 |
| 6,227,246 B1 | * | 5/2001 | Hall et al. ................. 137/625.41 |
| 6,427,260 B1 | * | 8/2002 | Osborne-Kirby .......... 4/678 |
| 6,481,634 B1 | * | 11/2002 | Zosimadis ................ 236/12.12 |

FOREIGN PATENT DOCUMENTS

JP    6323920    * 11/1994    ........... G01K/1/14

* cited by examiner

Primary Examiner—Christopher W. Fulton
Assistant Examiner—G. Verbitsky
(74) Attorney, Agent, or Firm—Bacon & Thomas, PLLC

(57) ABSTRACT

A tap water temperature measuring device. The device includes a tube device having first and second ends and a straight bore there through, a multi-connector attached to the first end of the tube device, a filter attached to the second end of the tube device 20, and an integrated circuit board connected to the tube device 20. A circuit activation probe is connected to the integrated circuit board. The circuit activation probe includes a water sensing probe and a temperature probe. The water sensing probe and the temperature probe extend into the straight bore of the tube device such that the circuit activation probe is only activated when the water sensing probe detects the presence of water in the bore of the tube device, after which, the temperature probe is activated to transmit a temperature reading to the integrated circuit board.

5 Claims, 6 Drawing Sheets

TAP WATER TEMPERATURE MEASURING DEVICE

BACKGROUND OF THE INVENTION

1. Field of Invention

The present invention is related to a tap water temperature-measuring device. This device measures water temperature from the tap by a thermoscope IC board inside of device tube. The system not only enables users to be aware of the temperature from the tap but also allow users to observe and control the temperature.

2. Description of Related Art

Many tap manufacturers utilize various tap transforming systems adapted for convenience to the buyers. The tap transforming system is located on the tap where the water comes out. Therefore, the user can easily replace, and fill the tap water from this system. The ordinary tap transforming system contains advantages of convenience in many ways. However, it cannot provide the user with instant water temperature. Especially in the Frigid Zone, the user can never tell the water temperature, hence increasing the danger to the user.

SUMMARY OF THE INVENTION

One purpose of the present invention is to provide a water temperature-measuring device that includes a tube device between a multi-connector and a filter. A thermoscope IC (temperature sensing integrated circuit) board is arranged inside of the tube device. This is formed by a circuit activation probe, which combines the water sensing probe and the temperature probe. As the water passes by the probes, this will activated the switch which activates the circuit of the IC board. The temperature probe detects the water temperature from the tap and continuously sends information to the tube device.

Another purpose of this invention is to be able to observe and measure the water temperature at all times. The liquid crystal display and the warning light system are located on the side of the device tube which is connected to the circuit activation probe. When the temperature is high, the warning light is activated to warn the users of the high temperature. On the other hand, when the temperature is low, the temperature probe of the circuit activation probe will warn the user by lighting up the low temperature warning light.

DETAILED DESCRIPTION OF THE PREFERRED EMBODIMENT

Figure 1:
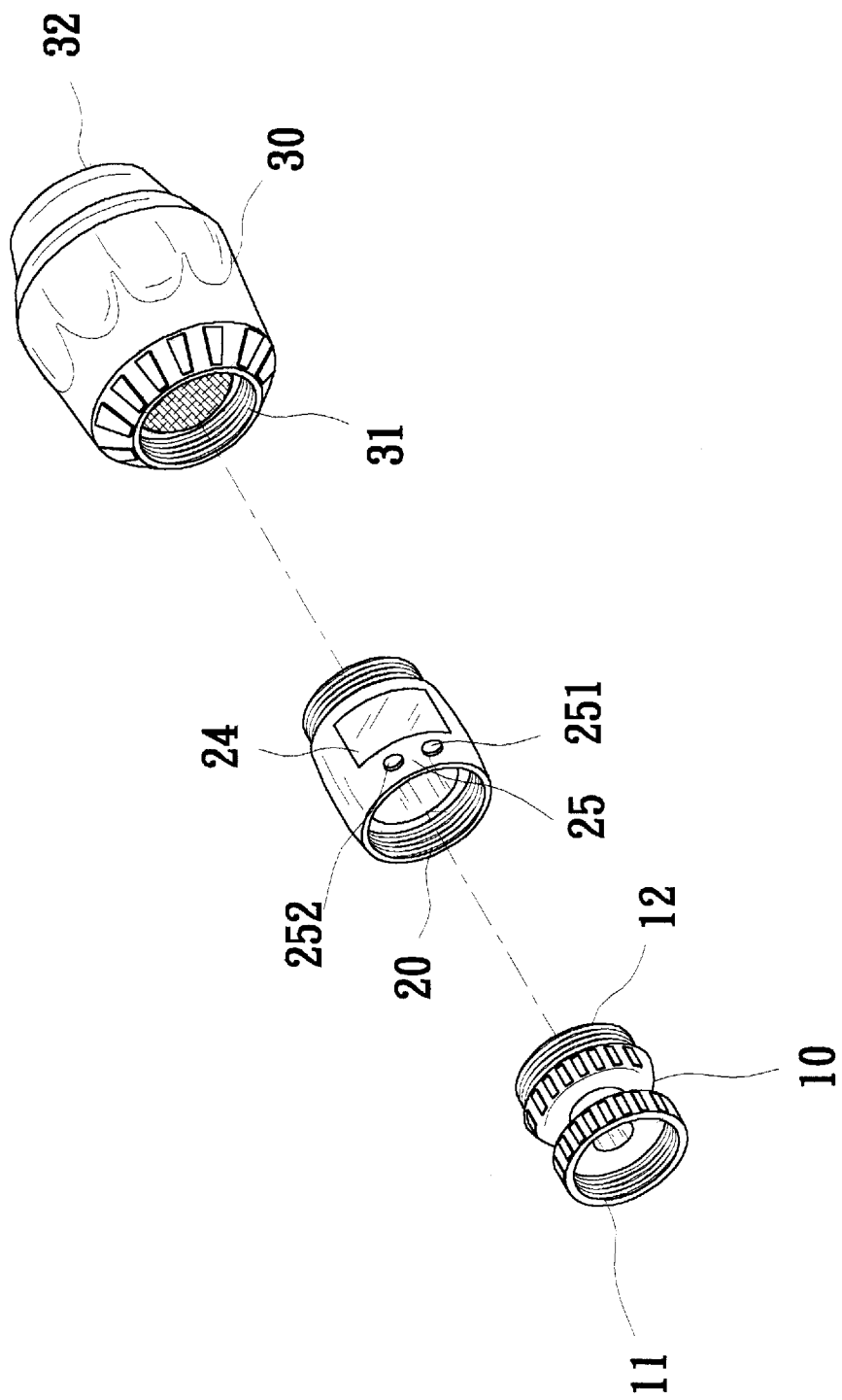
FIG. 1 shows an exploded view of the present invention.

Referring to FIG. 1, the tap water temperature measuring device of the present invention includes a multi-connector (10), a tube device (20) and a filter (30), wherein the multi-connector (10) includes an upper connecting component (11) and a lower connecting component (12) having an inner vacant space. The upper connecting component (11) allows the connection of the multi-connector (10) to the tap, whereas the lower connecting component (12) is connected to the tube device (20), and the inner vacant space of the multi-connector permits water to run through to the tube device (20).

Figure 3:
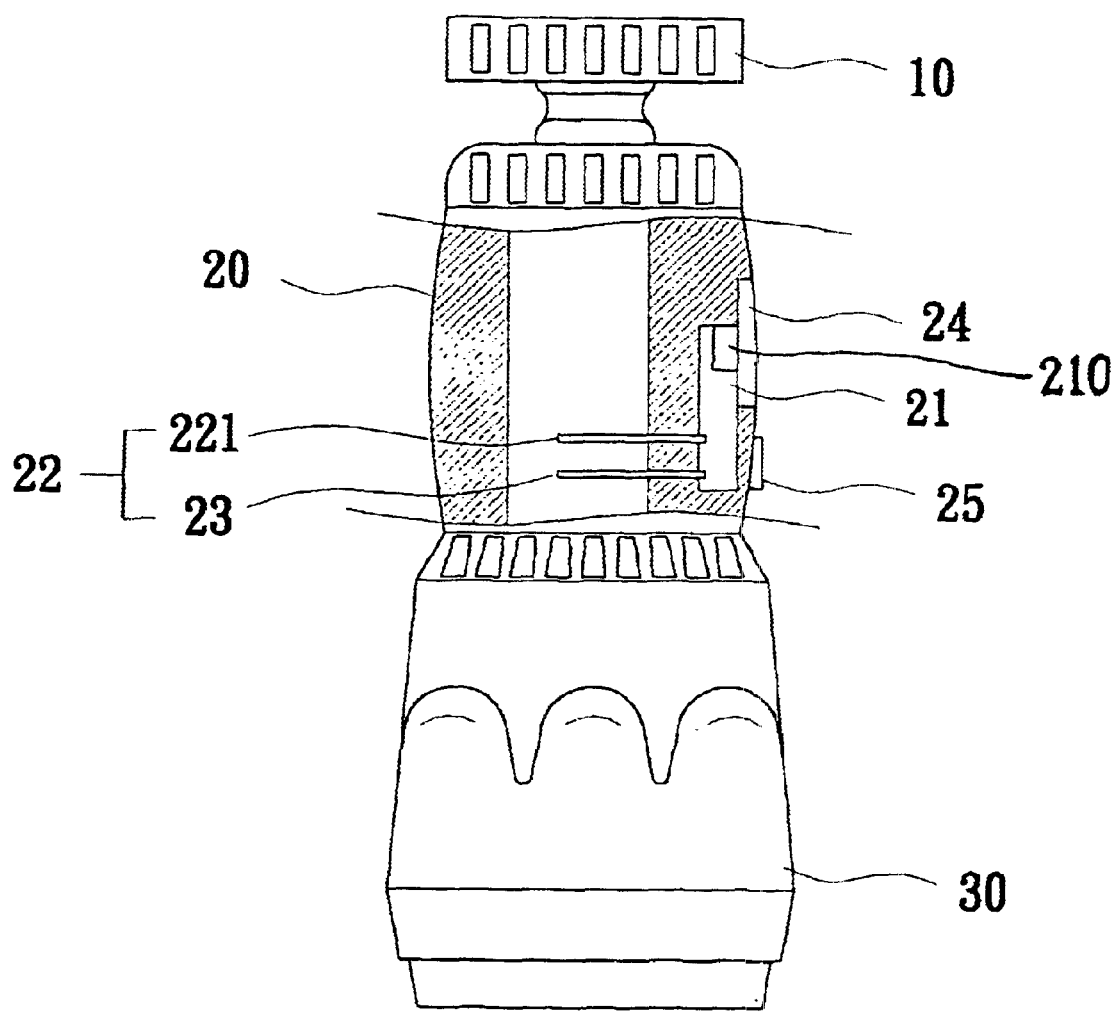
FIG. 3 shows a side view, partially in section of the present invention.
Figure 4:
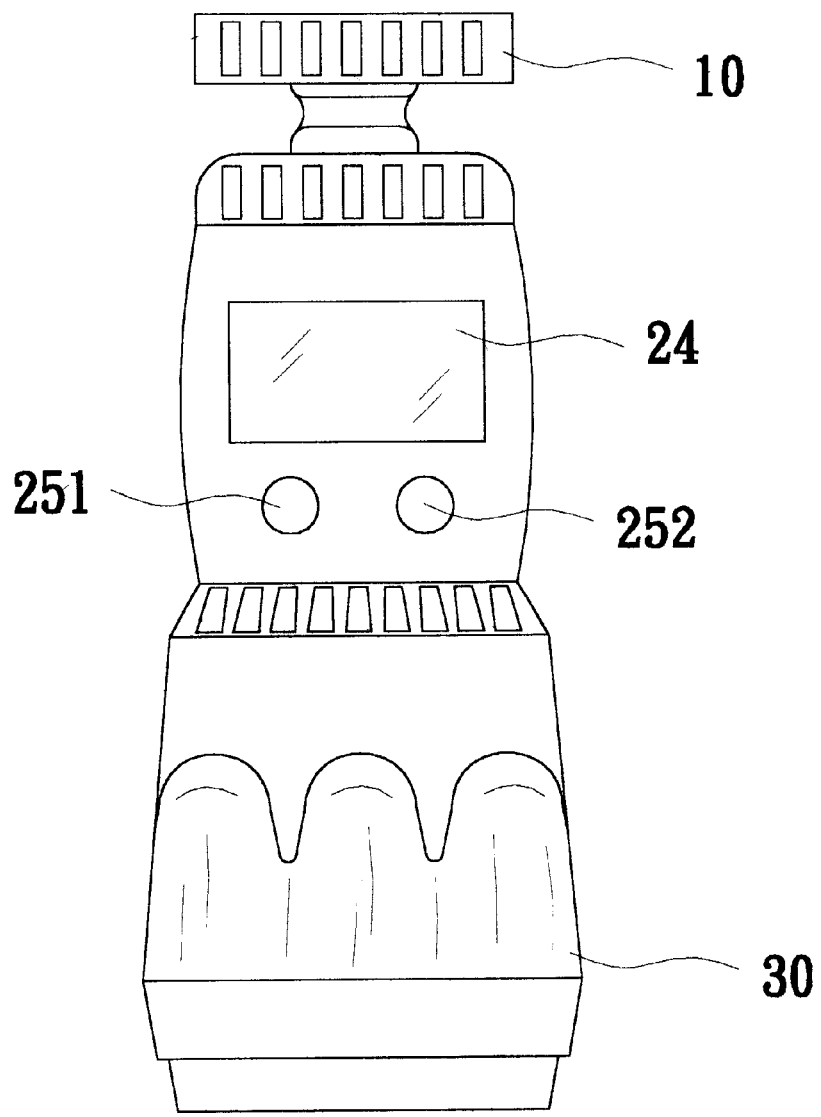
FIG. 4 shows a side view of another embodiment of the present invention.

With reference to FIG. 3 the tube device (20) includes internal screw threads and external screw threads. The thermoscope integrated circuit (IC) board (21) and the circuit activation probe (22) are built within the device tube. The circuit activation probe (22) includes a water sensing probe (221) and a temperature probe (23). These two probes are embedded to the liquid crystal display LCD (24) on one end, while the other end inserted within the tube device (20) to form a complete network with the warning indicator lights (25). The water sensing probe (221) detects running water, activates the mercurial battery (210) to power the thermoscope IC board (21).

The temperature probe (23) is a thermoscope probe which detects tap water temperature, and when water runs through the temperature probe, it detects the temperature of the water and transmits information to the liquid crystal display LCD (24) and the warning indicator lights (25) on the tube device (20). The LCD (24) is embedded into the tube device (20), and the warning indicator lights (25) are located on the interface of the tube device (20) and includes a high temperature warning light (251) and a low temperature warning light (252) on the surface of the tube device (20). The filter (30) includes an activated carbon or sponge rod, and the connecting component (31) of the filter (36) includes an internal thread at one end that connects to the tube device (20), and to a water hole (32) at the other end.

Figure 2:
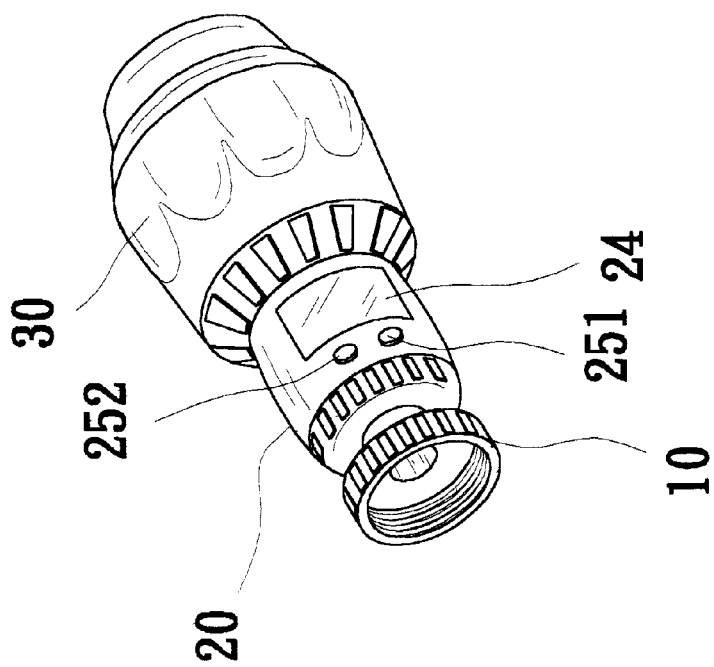
FIG. 2 shows a perspective view of the present invention.
Figure 5:
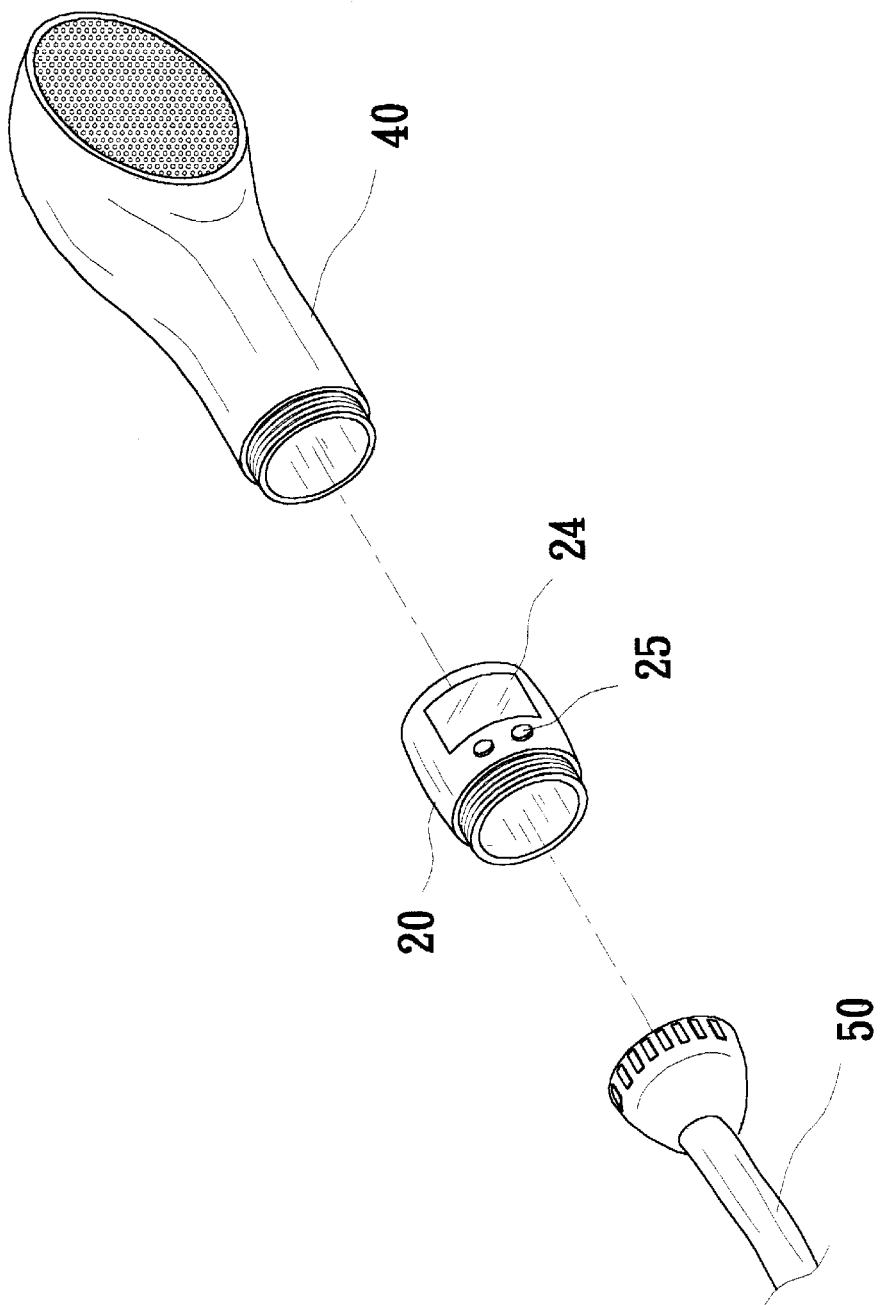
FIG. 5 is an exploded view of another application of the present invention.
Figure 6:
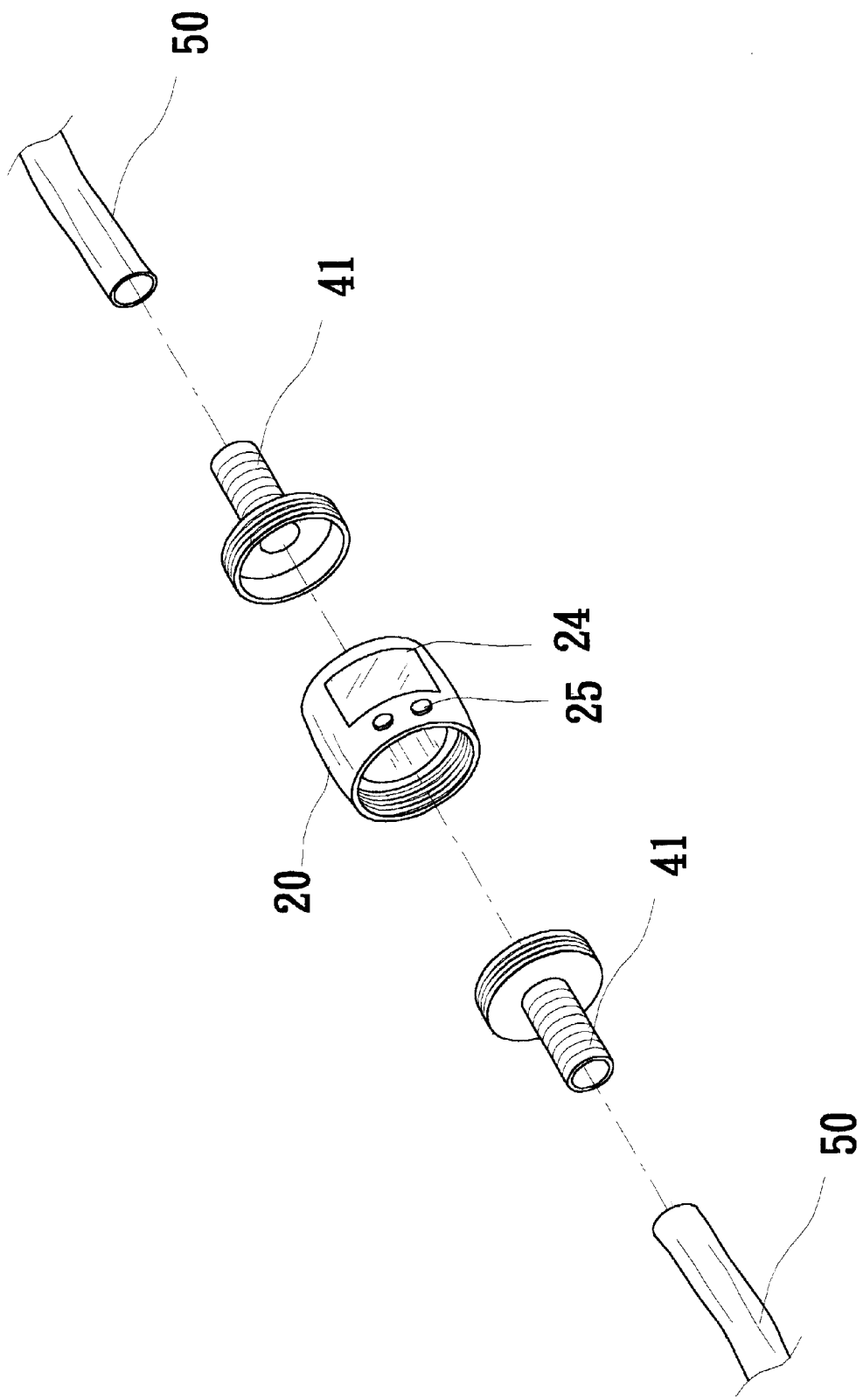
FIG. 6 is an exploded view of yet another application of the present invention.

With reference to FIG. 2, the tap water temperature measuring device of the present invention can be customized to connect to the tap or any other tube, for example, a showerhead (40) as in FIG. 5, and a tube extension as in FIG. 6. The tube device (20) is placed in the idle state when there is no water running therethrough, but when water flows through the tube device (20), the water sensing probe (221) of the circuit activation probe (22) and the thermoscope IC board (21) are activated. The running water will then activate the mercury battery to produce sufficient electricity to power the measuring device unit. The temperature probe (23) will monitor the water temperature of the running water and pass the reading to the LCD (24) and the warning indicator lights (25). The LCD shows the current temperature and the warning indicator lights shows the state of the water temperature. The high temperature warning light (251) will be activated to indicate that the water temperature is too high, whereas the low temperature warning light (252) will be activated to indicate that the water temperature is too cold, hence to offer users a more convenient and effective water temperature measuring device, allowing the user to use water at an appropriate temperature.

In addition, with reference to FIG. 5, the tap water temperature measuring device of the present invention can be used together with a showerhead connected to the extension tube. The device will show the current water temperature to warn users of extreme water temperatures when showering. Also, the present invention can be used for other purposes. With reference to FIG. 6, there is a screw thread on a water outlet (41) connected to one end of the tube device (20). The other end of water outlet (41) can be connected to any water tube (50) so that user will be notified of the water temperature of water flowing through the tube device (20).

What is claims is:

1. A tap water temperature measuring device, comprising:
   a tube device having first and second ends and a straight bore therethrough;
   a multi-connector attached to the first end of the tube device;
   a filter attached to the second end of the tube device;
   an integrated circuit board connected to the tube device;
   a circuit activation probe connected to the integrated circuit board, the circuit activation probe comprising a water sensing probe and a temperature probe, the water sensing probe and the temperature probe extend into the straight bore of the tube device such that the circuit activation probe is only activated when the water sensing probe detects the presence of water in the straight bore of the tube device, thereafter, the temperature probe is activated to transmit a temperature reading to the integrated circuit board;
   a display connected to the integrated circuit board and configured to display the temperature of water in the tube device; and
   a power source in connection with the water sensing probe, the temperature probe and the display.

2. The tap water temperature measuring device as claimed in claim 1, wherein the display is selected from the group consisting of at least one Liquid Crystal Display panel and at least one warning indicator light.

3. The tap water temperature measuring device as claimed in claim 1, wherein the display is attached to an outer surface of the tube device.

4. The tap water temperature measuring device as claimed in claim 2, wherein the at least one warning light comprises a high temperature warning light and a low temperature warning light.

5. The tap water temperature measuring device as claimed in claim 1, the power source is a mercury battery.

* * * * *